(12) United States Patent
Sutter et al.

(10) Patent No.: US 12,452,068 B2
(45) Date of Patent: *Oct. 21, 2025

(54) WHITE-LABELED DATA CONNECTIONS FOR MULTI-TENANT CLOUD PLATFORMS

(71) Applicant: AppDirect, Inc., San Francisco, CA (US)

(72) Inventors: Edward Robert Sutter, Denver, CO (US); Ian Matthew Nicholson, Calgary (CA); Thomas Anthony Schoendorfer, Calgary (CA)

(73) Assignee: AppDirect, Inc., San Francisco, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/504,431

(22) Filed: Nov. 8, 2023

(65) Prior Publication Data
US 2024/0073023 A1     Feb. 29, 2024

Related U.S. Application Data

(63) Continuation of application No. 16/718,064, filed on Dec. 17, 2019, now Pat. No. 11,863,673.

(51) Int. Cl.
*H04L 9/32*     (2006.01)

(52) U.S. Cl.
CPC .......... *H04L 9/3213* (2013.01); *H04L 9/3226* (2013.01)

(58) Field of Classification Search
CPC .............................. H04L 9/3213; H04L 9/3226
See application file for complete search history.

(56) References Cited

U.S. PATENT DOCUMENTS

| | | |
|---|---|---|
| 9,444,620 B1 * | 9/2016 | Murphy .............. H04L 63/0876 |
| 9,628,471 B1 | 4/2017 | Sundaram et al. |
| 10,324,606 B1 | 6/2019 | Nair et al. |

(Continued)

FOREIGN PATENT DOCUMENTS

WO     2018-053122 A1     3/2018

OTHER PUBLICATIONS

Hardt, E., The OAuth 2.0 Authorization Framework, Oct. 2012, Updated 8252, downloaded OAuth 2.0 Spec: https://tools.ietf.org/html/rfc6749, 77 pages.

(Continued)

*Primary Examiner* — Henry Tsang
(74) *Attorney, Agent, or Firm* — McDermott Will & Schulte LLP (57) ABSTRACT

Various aspects of the subject technology relate to systems, methods, and machine-readable media for connecting to an independent software vendor (ISV). The method includes receiving, at an integrated platform, a request to initiate a data connection with the ISV. The request may include a web address of the ISV. The method also includes associating, through the integrated platform, the data connection with a unique identifier. The method also includes issuing an authorization code based on authentication of an authorization request for the data connection. The method also includes exchanging, with a connector service, the authorization code for tokens utilized for establishing the data connection with the ISV. The method also includes receiving access to the ISV through the integrated platform.

20 Claims, 9 Drawing Sheets

(56) References Cited

U.S. PATENT DOCUMENTS

| | | | |
|---|---|---|---|
| 10,726,491 | B1 | 7/2020 | Hockey et al. |
| 2006/0168264 | A1* | 7/2006 | Baba .................. H04L 12/2809 709/230 |
| 2011/0239283 | A1 | 9/2011 | Chern |
| 2011/0314482 | A1 | 12/2011 | Cupala et al. |
| 2012/0278725 | A1 | 11/2012 | Gordon et al. |
| 2014/0006977 | A1* | 1/2014 | Adams ................ H04L 12/1818 715/753 |
| 2014/0164504 | A1 | 6/2014 | Dellenbach et al. |
| 2015/0156065 | A1 | 6/2015 | Grandhe et al. |
| 2016/0004820 | A1 | 1/2016 | Moore |
| 2016/0028737 | A1* | 1/2016 | Srinivasan .......... H04L 63/0807 726/4 |
| 2016/0350822 | A1 | 12/2016 | Ganesan |
| 2017/0126649 | A1 | 5/2017 | Votaw et al. |
| 2018/0075231 | A1* | 3/2018 | Subramanian ...... H04L 63/0807 |
| 2018/0217900 | A1 | 8/2018 | Prahlad et al. |
| 2019/0286832 | A1* | 9/2019 | Szeto ................. H04W 12/082 |
| 2019/0349447 | A1 | 11/2019 | Adams et al. |
| 2019/0354354 | A1* | 11/2019 | Dubinskii ........... G06F 11/3466 |

OTHER PUBLICATIONS

Using OAuth 2.0, Slack: https://api.slack.com/docs/oauth, 8 pages.
Microsoft Teams: Office Products—retrieved on Apr. 3, 2020 from https://docs.microsoft.com/enus/microsoftteams/platform/concepts/authentication/authentication; 6 pages.
US/ISA—International Search Report and Written Opinion for related International Application No. PCT/US2021/052455 mailed Jan. 20, 2022, 12 pgs.

* cited by examiner

WHITE-LABELED DATA CONNECTIONS FOR MULTI-TENANT CLOUD PLATFORMS

This application claims priority under 35 U.S.C. § 120 as a continuation of U.S. patent application Ser. No. 16/718,064, filed Dec. 17, 2019, the disclosures of all of these applications and patents are incorporated by reference herein.

TECHNICAL FIELD

The present disclosure generally relates to independent software vendor (ISV) connectors, and more particularly to connecting to multiple ISVs simultaneously through a white-labeled experience.

BACKGROUND

Conventionally, data integrations between two separate secure systems are made possible through adoption of an open standard for authorization known as OAuth 2.0 with proprietary techniques or customizations built on top of it. An important shortcoming of existing technologies is that data integration flows cannot be performed through white-labeled integration experiences. Another important shortcoming of existing technologies is that users are only allowed to make a single data connection into a third party service. Thus, if a user has multiple accounts in this third party service, they will be unable to connect them all.

BRIEF SUMMARY

The subject disclosure addresses the shortcomings in existing technologies by allowing users to connect to multiple third party accounts simultaneously through a white-labeled experience. According to an aspect, when a user establishes a bidirectional data connection with a data connector (e.g., a software plugin that performs the work of retrieving data from a cloud service and pushing it into an integrated platform, or vice versa), the integrated platform will first send an asynchronous and secured message to the connector with the following information: 1) an identifier for the integrated platform tenant where the data connection was created, and 2) a unique identifier for that data connection. The connector will respond with a unique state token that the integrated platform binds to the data connection. Next, the integrated platform initializes the data connection by sending the user down a typical OAuth 2.0 flow with the state token included in the standard state parameter. The connector then uses the state token to lookup information for the appropriate authorization service to complete the data connection initialization.

According to one embodiment of the present disclosure, a computer-implemented method is provided for connecting to an independent software vendor (ISV). The method includes receiving, at an integrated platform, a request to initiate a data connection with the ISV. The request may include a web address of the ISV. The method also includes associating, through the integrated platform, the data connection with a unique identifier. The method also includes issuing an authorization code based on authentication of an authorization request for the data connection. The method also includes exchanging, with a connector service, the authorization code for tokens utilized for establishing the data connection with the ISV. The method also includes receiving access to the ISV through the integrated platform.

According to one embodiment of the present disclosure, a system is provided including a processor and a memory comprising instructions stored thereon, which when executed by the processor, causes the processor to perform a method for connecting to an independent software vendor (ISV). The method includes receiving, at an integrated platform, a request to initiate a data connection with the ISV. The request may include a web address of the ISV. The method also includes associating, through the integrated platform, the data connection with a unique identifier. The method also includes issuing an authorization code based on authentication of an authorization request for the data connection. The method also includes exchanging, with a connector service, the authorization code for tokens utilized for establishing the data connection with the ISV. The method also includes receiving access to the ISV through the integrated platform.

According to one embodiment of the present disclosure, a non-transitory computer-readable storage medium is provided including instructions (e.g., stored sequences of instructions) that, when executed by a processor, cause the processor to perform a method for connecting to an independent software vendor (ISV). The method includes receiving, at an integrated platform, a request to initiate a data connection with the ISV. The request may include a web address of the ISV. The method also includes associating, through the integrated platform, the data connection with a unique identifier. The method also includes issuing an authorization code based on authentication of an authorization request for the data connection. The method also includes exchanging, with a connector service, the authorization code for tokens utilized for establishing the data connection with the ISV. The method also includes receiving access to the ISV through the integrated platform.

According to one embodiment of the present disclosure, a system is provided that includes means for storing instructions, and means for executing the stored instructions that, when executed by the means, cause the means to perform a method for connecting to an independent software vendor (ISV). The method includes receiving, at an integrated platform, a request to initiate a data connection with the ISV. The request may include a web address of the ISV. The method also includes associating, through the integrated platform, the data connection with a unique identifier. The method also includes issuing an authorization code based on authentication of an authorization request for the data connection. The method also includes exchanging, with a connector service, the authorization code for tokens utilized for establishing the data connection with the ISV. The method also includes receiving access to the ISV through the integrated platform.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Conventionally, data integrations between two separate secure systems are made possible through adoption of an open standard for authorization known as OAuth 2.0 with proprietary techniques or customizations built on top of it. An important shortcoming of existing technologies is that data integration flows cannot be performed through white-labeled integration experiences. Another important shortcoming of existing technologies is that users are only allowed to make a single data connection into a third party service. Thus, if a user has multiple accounts in this third party service, they will be unable to connect them all.

Aspects of the present disclosure address these issues by providing systems and methods for white-labeled data connections for multi-tenant cloud platforms. In an implementation, when a user establishes a bidirectional data connection with a data connector, an integrated platform will first send an asynchronous and secured message to a connector. The secured message may inform the connector which integrated platform tenant (e.g., which cloud instance) has started a data connection. The secured message may also supply a unique identifier for the data connection. The connector will respond with a unique state token that the integrated platform binds to the data connection. Next, the integrated platform initializes the data connection by sending the user down a typical OAuth 2.0 flow with the state token included in the standard state parameter. The connector then uses the state token to lookup information for the appropriate authorization service to complete the data connection initialization. According to aspects, the data connector may include a software plugin that performs the work of retrieving data from a cloud service and pushing it into an integrated platform, or vice versa.

The disclosed system addresses a problem in traditional data connections for multi-tenant cloud platforms tied to computer technology, namely, the technical problem of establishing white-labeled data connections through an integrated platform. The disclosed system solves this technical problem by providing a solution also rooted in computer technology, namely, by providing for a secure process for establishing multiple white-labeled data connections through an integrated platform. The disclosed subject technology further provides improvements to the functioning of the computer itself because it improves processing and analysis of the data.

Figure 1:
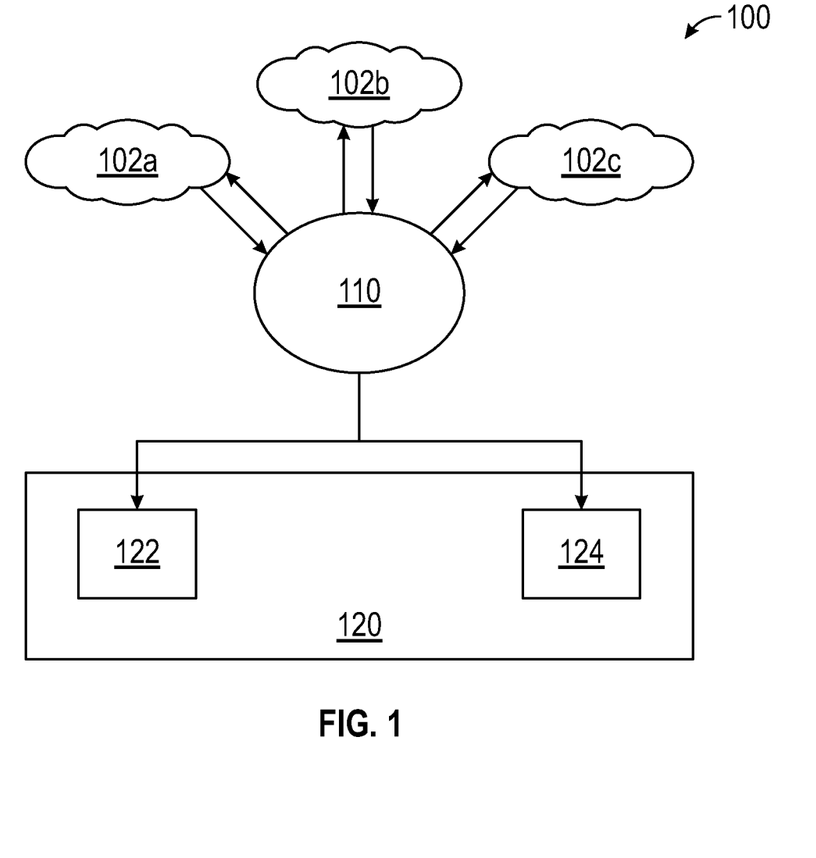
FIG. 1 illustrates a system for white-labeled data connections for multi-tenant cloud platforms, according to certain aspects of the disclosure.

FIG. 1 illustrates a system 100 for white-labeled data connections for multi-tenant cloud platforms 102, according to certain aspects of the disclosure. It is understood that reference number 102 includes reference to reference numbers 102a, 102b, and 102c as well. For example, the cloud service 102 may include independent software vendors (ISVs). It is further understood that although three cloud services 102a, 102b, and 102c are shown, more or less may be included without departing from the scope of the disclosure.

According to an aspect, the cloud service 102 may communicate with a data connector 110. The data connector 110 may also communicate with an integrated platform 120. For example, the data connector 110 may include processes that move data from one database to another. In an implementation, these processes may allow for filtering and transformation of the data into a proper format or structure for the purposes of querying and analysis.

The integrated platform 120 may include a first functionality 122 and a second functionality 124. For example, the first functionality 122 and the second functionality 124 may be configured to analyze the data ingested from the cloud services 102. According to aspects, the first functionality 122 may include a search and feed feature, and the second functionality 124 may include a data visualization feature. It is understood that although the first functionality 122 and the second functionality 124 are shown as separate in the integrated platform 120, they may be integrated into a single functionality that includes both the search and feed and data visualization features. It is further understood that additional functionalities may be included in the integrated platform 120 without departing from the scope of the disclosure.

Figure 2A:
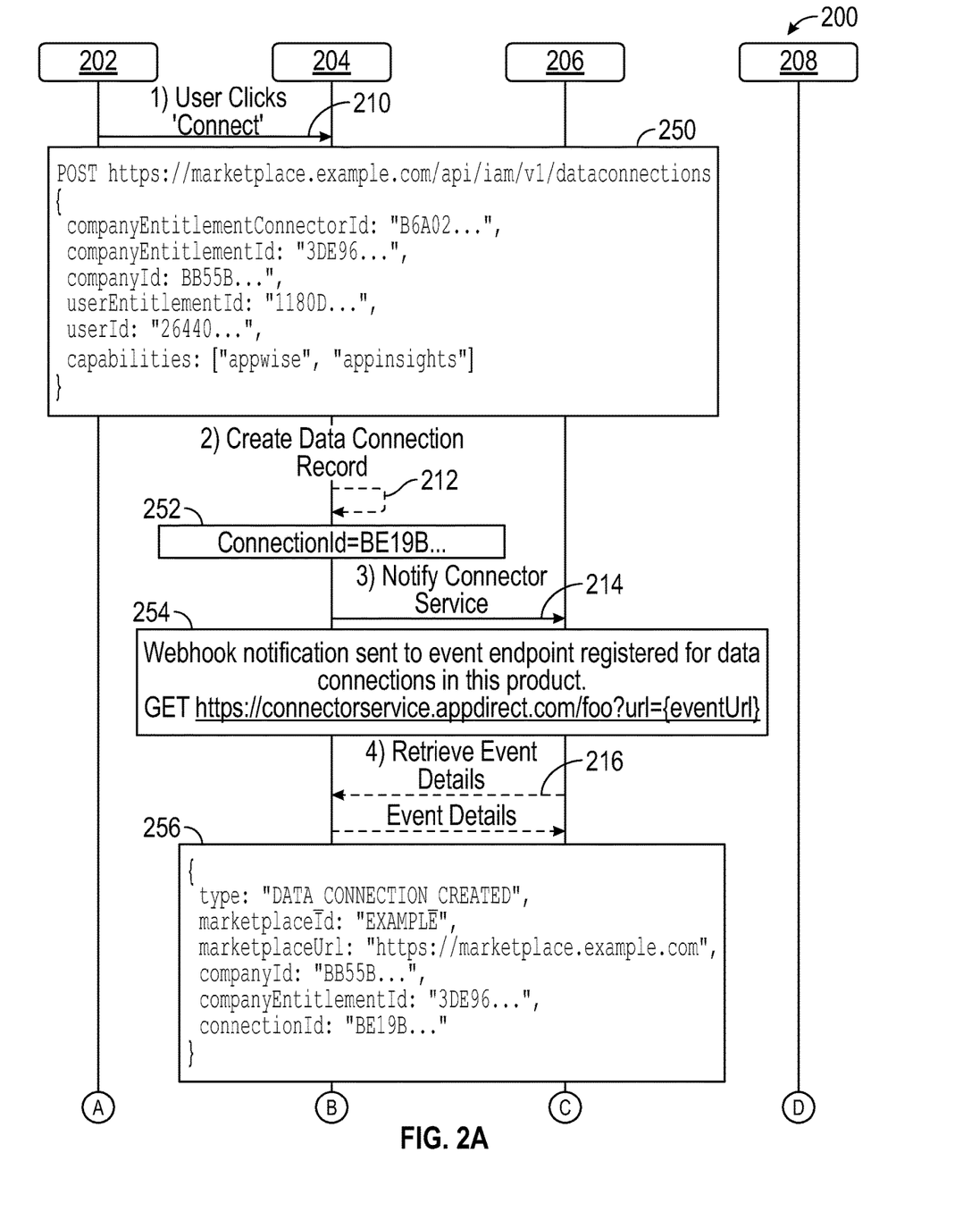
FIGS. 2A-2C illustrate a software flow diagram for creating a data connection, according to certain aspects of the disclosure.
Figure 2B:
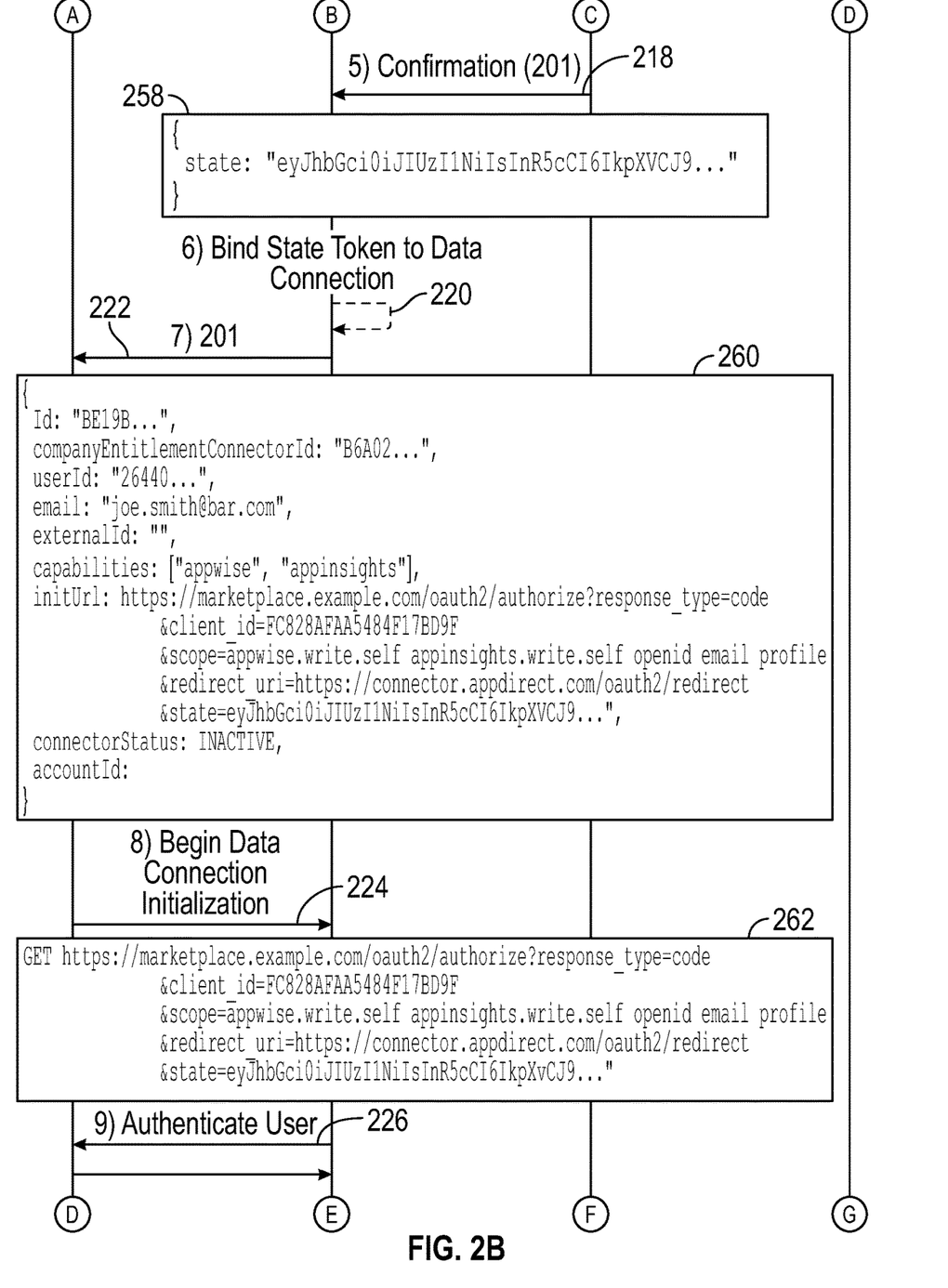
Figure 2C:
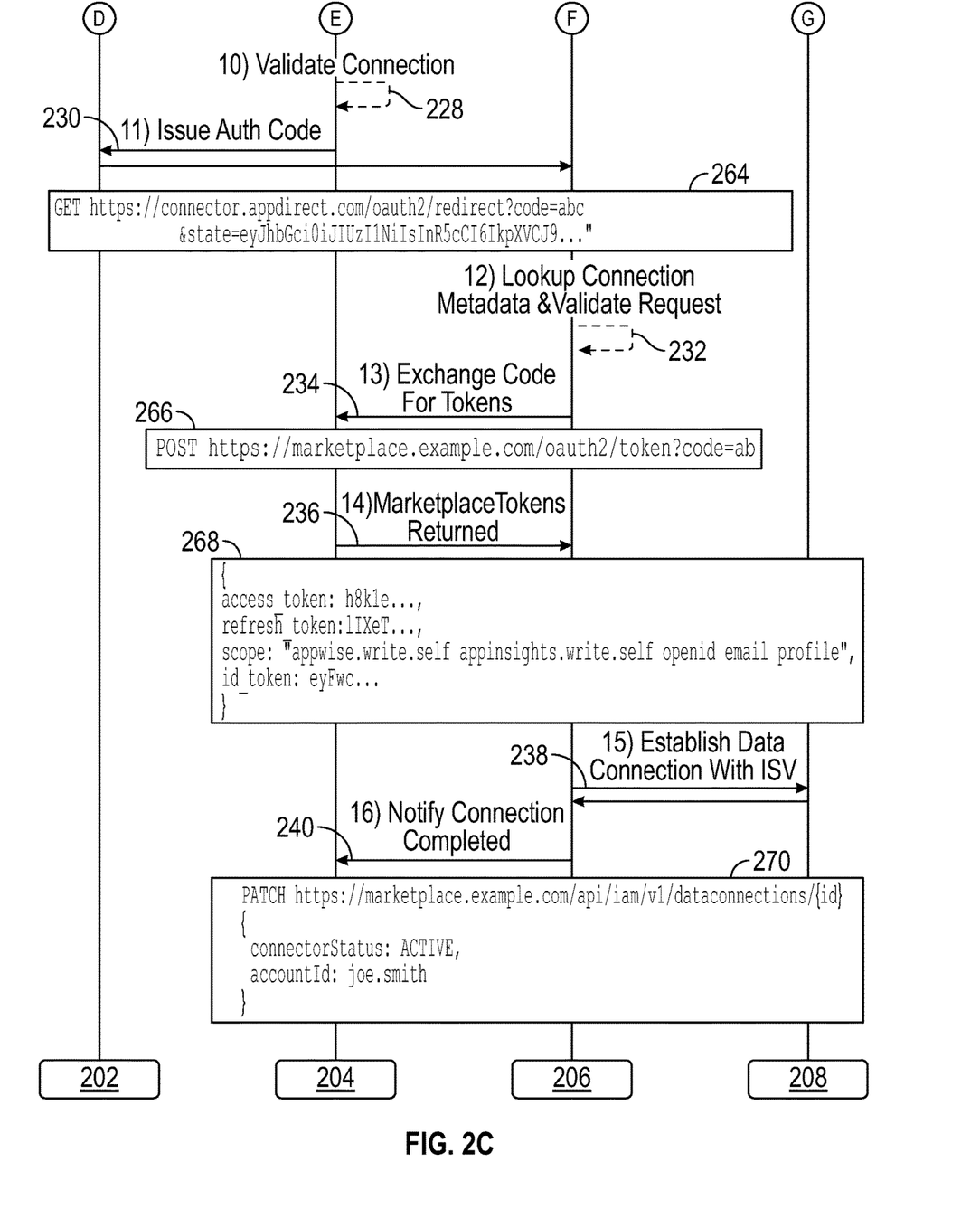

FIGS. 2A-2C illustrate a software flow diagram 200 for creating a data connection, according to certain aspects of the disclosure. For example, the software flow diagram 200 illustrates communication between a user 202 (e.g., through a browser), an integrated platform 204, a data connector service 206, and at least one ISV 208. It is understood that although one ISV 208 is shown, additional ISVs may be connected to without departing from the scope of the disclosure. For example, the integrated platform 204 may be the integrated platform 120 of FIG. 1, and the ISV 208 may be ISVs 102 of FIG. 1.

At step 210, the user 202 may initiate a connection through the integrated platform 204. Initiating the connection may cause connection data 250 to be communicated to the integrated platform 204 and the data connector service 206. The connection data 250 may include a Uniform Resource Locator (URL) (e.g., a web address) for a website the user 202 is attempting to access.

At step 212, the integrated platform 204 creates a data connection record. For example, the data connection record may include a connection identifier 252. At step 214, the integrated platform 204 notifies the data connector service 206 by sending a notification 254 to the data connector service 206.

At step 216, the data connector service 206 retrieves event details 256 from the integrated platform 204, and the integrated platform 204, in turn, sends the event details 256 to the data connector service 206. At step 218, a confirmation is sent from the data connector service to the integrated platform 204, which includes sharing of a state token 258. For example, the state token 258 may include an encryption of the connection identifier 252 for security purposes.

At step 220, the integrated platform 204 binds the state token 258 to the data connection (e.g., the connection data 250). At step 222, the integrated platform 204 communicates updated connection data 260 to the user 202. For example, the updated connection data 260 may include the state token 258 embedded in a state parameter.

At step 224, the user 202 communicates connection data 262 to the integrated platform 204. The connection data 262 may include the state token 258 embedded in a state parameter. At step 226, the integrated platform 204 authenticates the user 202. For example, the user 202 may provide login details to the integrated platform 204 for authentication of the user 202. At step 228, the integrated platform 204 validates the connection. At step 230, the integrated platform 204 issues an authorization code 264 to the user 202, and the user 202 then communicates the authorization code 264 to the data connector service 206. The authorization code 264 may include the state token 258 embedded in a state parameter.

At step 232 the data connector service 206 looks up connection metadata and validates the request. For example, the data connector service 206 may match the state token 258 that was embedded in the state parameter of the authorization code 264 with the connection identifier 252. In this way, the data connector service 206 may match the connection request with that of the user 202. At step 234, the data connector service 206 exchanges a code 266 for tokens 268 from the integrated platform 204. At step 236, the integrated platform 204 returns the tokens 268 to the data connector service 206. The tokens 268 may be used to call APIs on the integrated platform.

At step 238, the data connector service 206 establishes a connection with the ISV 208. At step 240, the integrated platform 204 sends a notification 270 to the user 202 that the bi-directional connection has been completed. The user 202 may then repeat the foregoing steps to connect to additional ISVs.

Figure 3A:
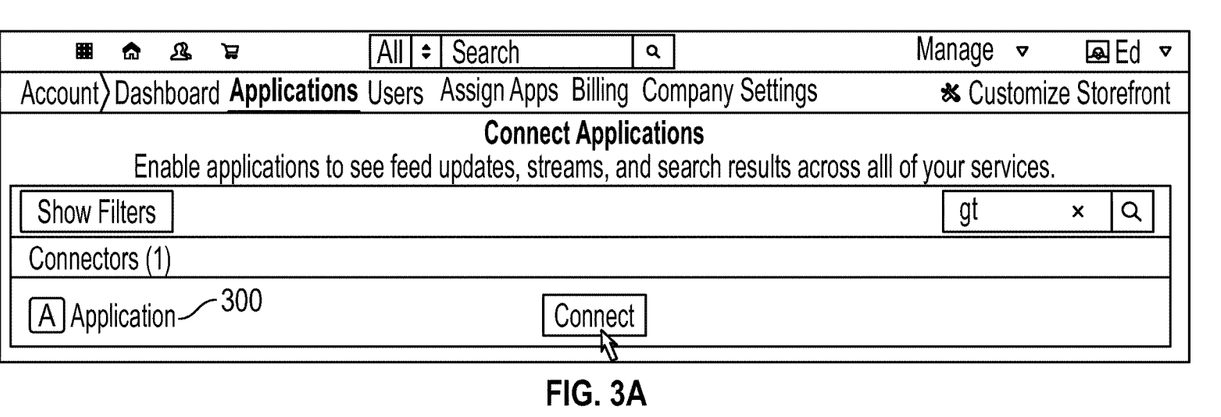
FIGS. 3A-3F illustrate example graphical user interfaces (GUIs) for white-labeled data connections for multi-tenant cloud platforms, according to certain aspects of the disclosure.

FIGS. 3A-3F illustrate example graphical user interfaces (GUIs) of an integrated platform for white-labeled data connections for multi-tenant cloud platforms, according to certain aspects of the disclosure. For example, the integrated platform may include the integrated platforms 120 and 204 of FIGS. 1 and 2. Referring to FIG. 3A, a user is presented with an option to connect an application 300 (e.g., an ISV). For example, a list of supported applications may be selected by the user. It is understood that although one application is shown to be selected, more applications may be selected for connection without departing from the scope of the disclosure.

Figure 3B:
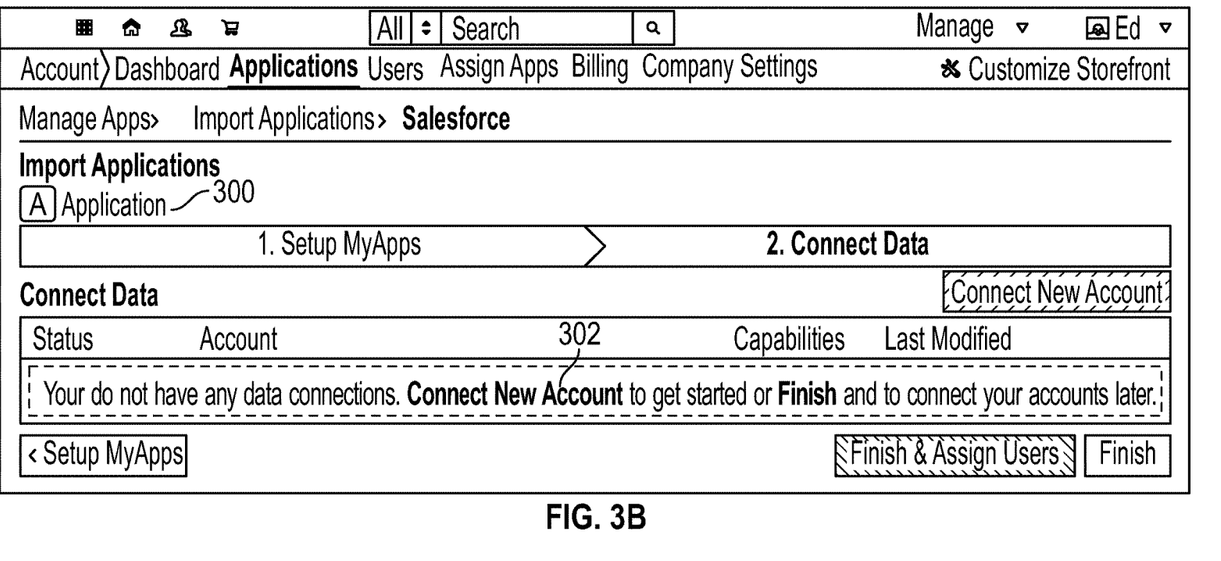
Figure 3C:
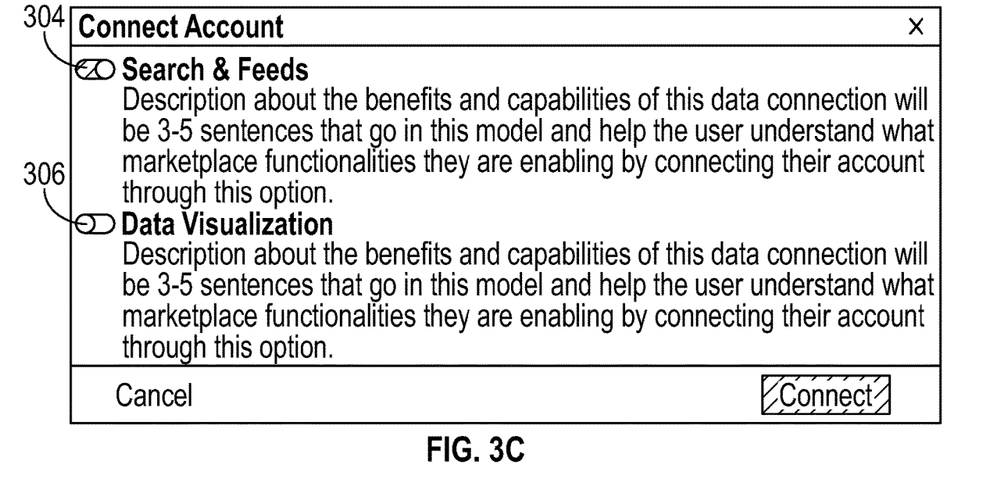

As shown in FIG. 3B, once the user has selected the application 300, the user is prompted 302 to connect a user account of the application 300 to the integrated platform. In FIG. 3C, the user may select between a first functionality 304 and a second functionality 306. For example, the first functionality 304 and the second functionality 306 may be configured to analyze the data ingested from the cloud services. According to aspects, the first functionality 304 may include a search and feed feature, and the second functionality 306 may include a data visualization feature. It is understood that although the first functionality 304 and the second functionality 306 are shown as separate in the integrated platform 120, they may be integrated into a single functionality that includes both the search and feed and data visualization features. It is further understood that additional functionalities may be included in the integrated platform without departing from the scope of the disclosure.

Figure 3D:
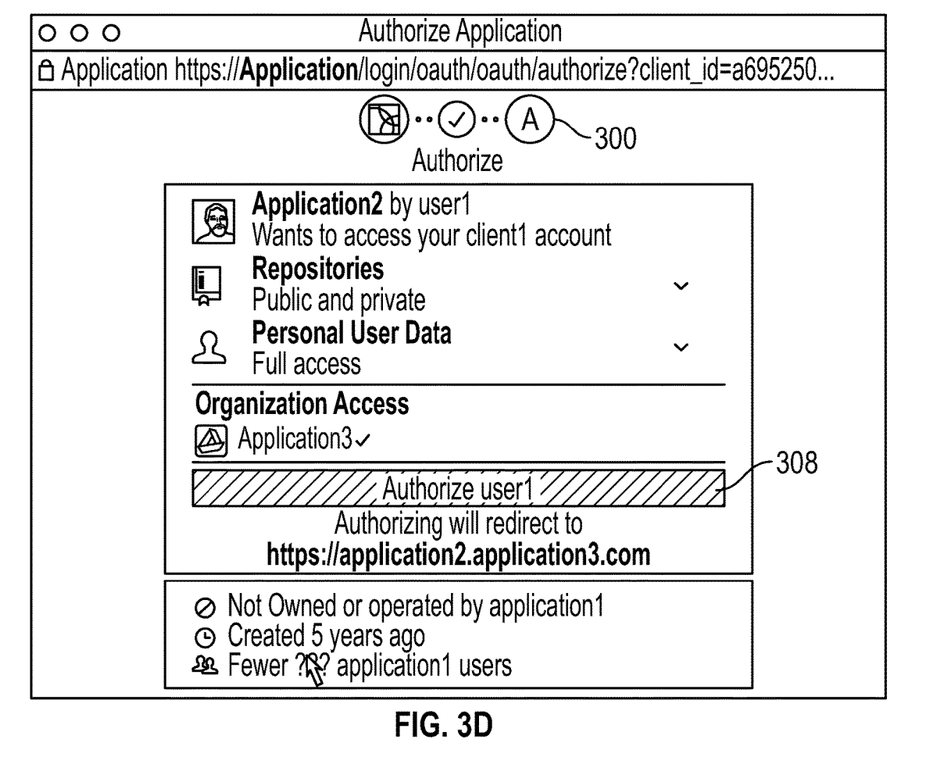
Figure 3E:
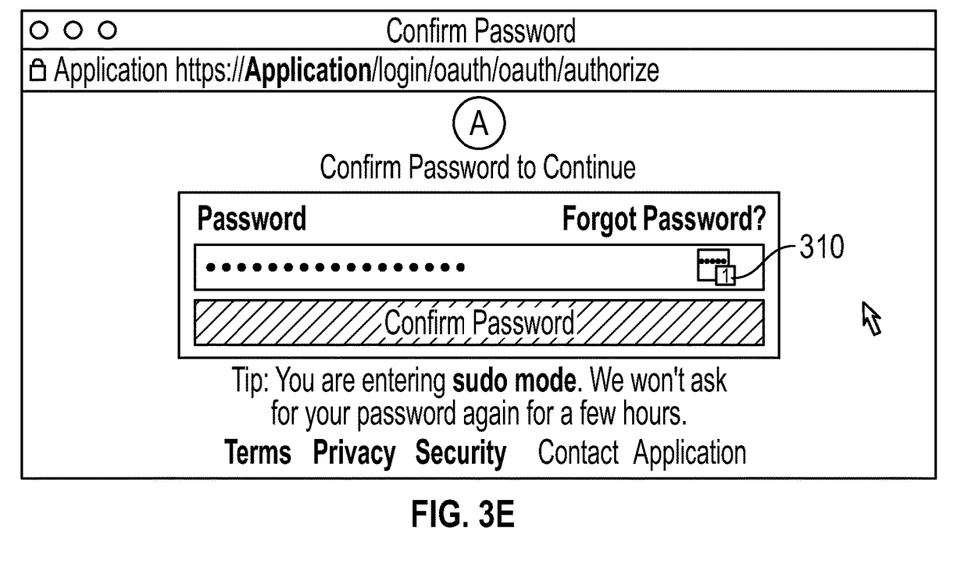
Figure 3F:
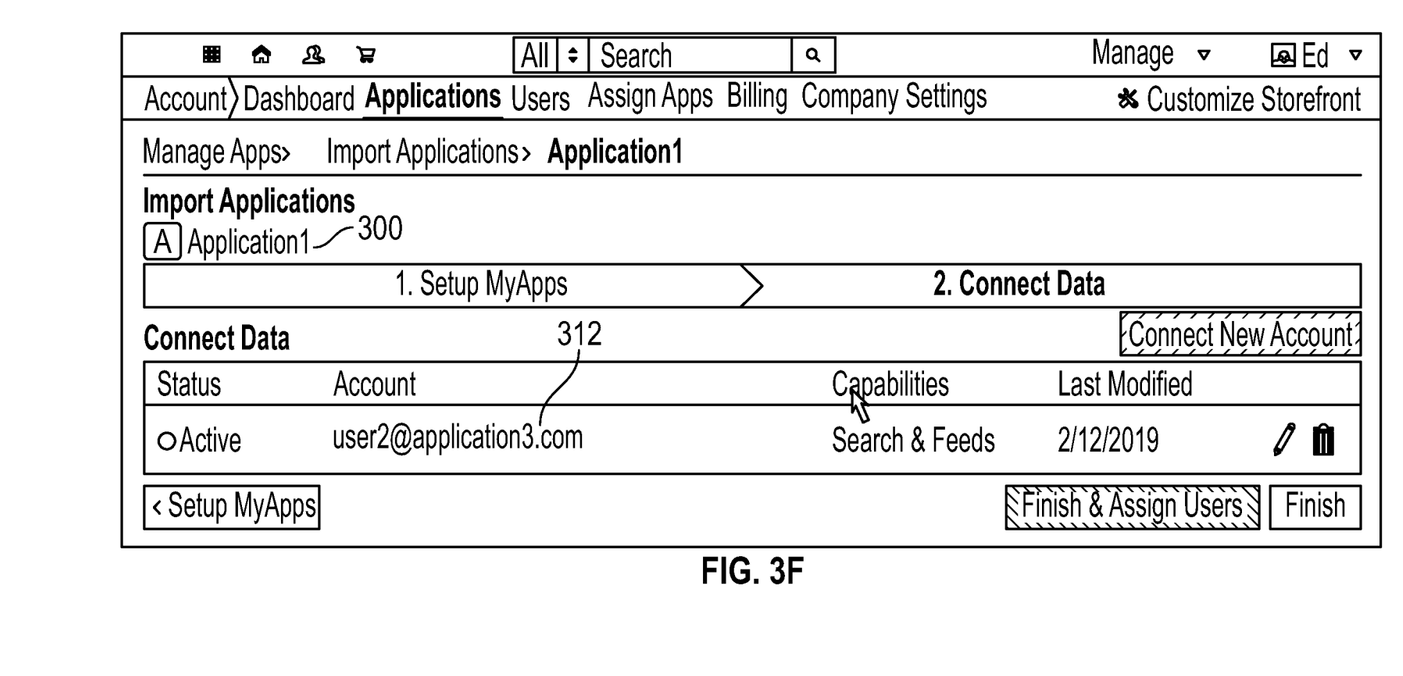

FIG. 3D illustrates an authorization interface that prompts the user to authorize 308 a connection to the application 300. The user then inputs their login credentials 310, as shown in FIG. 3E. Once validated, the user's account 312 is connected to the integrated platform, as shown in FIG. 3F. The user may now access data of the application 300 through the integrated platform for analysis or other purposes. The user may follow the same steps outlined above to connect additional applications.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
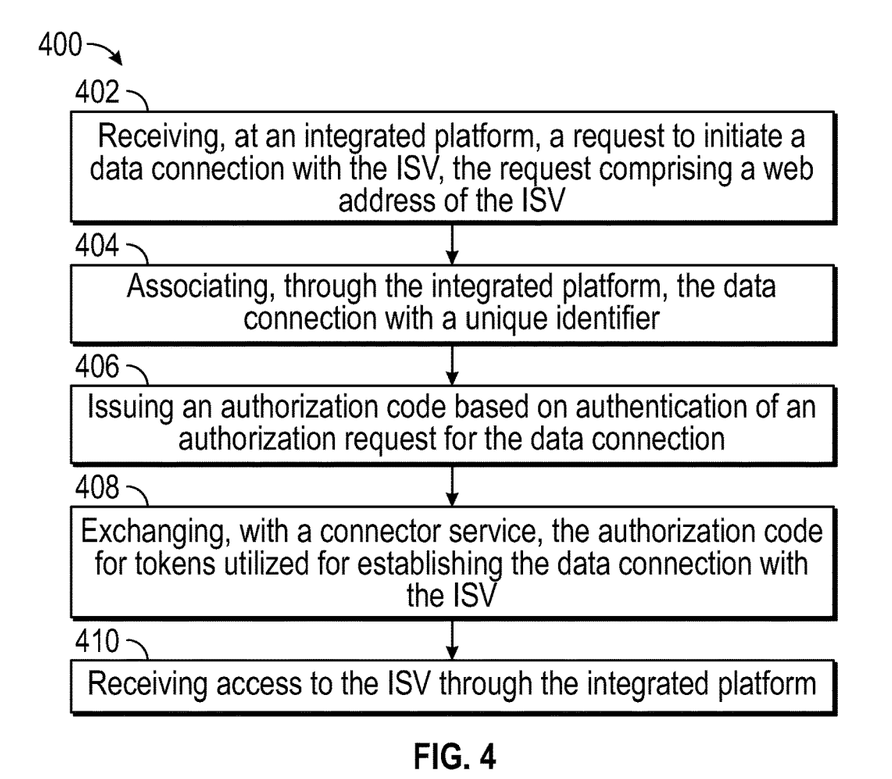
FIG. 4 illustrates an example flow chart for white-labeled data connections for multi-tenant cloud platforms, according to certain aspects of the disclosure.

FIG. 4 illustrates an example flow chart (e.g., process 400) for white-labeled data connections for multi-tenant cloud platforms, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, a request to initiate a data connection with an ISV is received at an integrated platform. The request may include a web address of the ISV. According to an aspect, the request may include a selection of a data analytics service. At step 404, the data connection is associated with a unique identifier through the integrated platform. At step 406, an authorization code is issued based on authentication of an authorization request for the data connection. At step 408, the authorization code is exchanged at a connector service for tokens that are utilized for establishing the data connection with the ISV. At step 410, access to the ISV is received through the integrated platform.

For example, as described above in relation to FIGS. 1-3, at step 402, a request 210 to initiate a data connection 302 with an ISV 102 and 208 is received at an integrated platform 120 and 204. The request 210 may include a web address (e.g., the web address may be included in connection data 250) of the ISV 102 and 208. The request 210 may also include selection of a data analytics service (e.g., first functionality 122 and 304, second functionality 124 and 306). At step 404, the data connection is associated with a unique identifier (e.g., connection identifier 252) through the integrated platform 120 and 204. At step 406, an authorization code 264 is issued based on authentication of an authorization request 230 for the data connection 302. At step 408, the authorization code 264 is exchanged at a connector service 206 for tokens 268 that are utilized for establishing the data connection 302 with the ISV 102 and 208. At step 410, access 312 to the ISV 102 and 208 is received through the integrated platform 120 and 204.

According to an aspect, the process 400 further includes initiating the data connection with a connector service. According to an aspect, the process 400 further includes encrypting a connection identifier to generate the unique identifier. According to an aspect, the process 400 further includes retrieving data of the ISV into the integrated platform through the connector service.

According to an aspect, the process 400 further includes including the unique identifier in a state parameter of the authorization request. According to an aspect, the process 400 further includes initiating, through the integrated platform, the authorization request for the data connection, the authorization request comprising the unique identifier.

Figure 5:
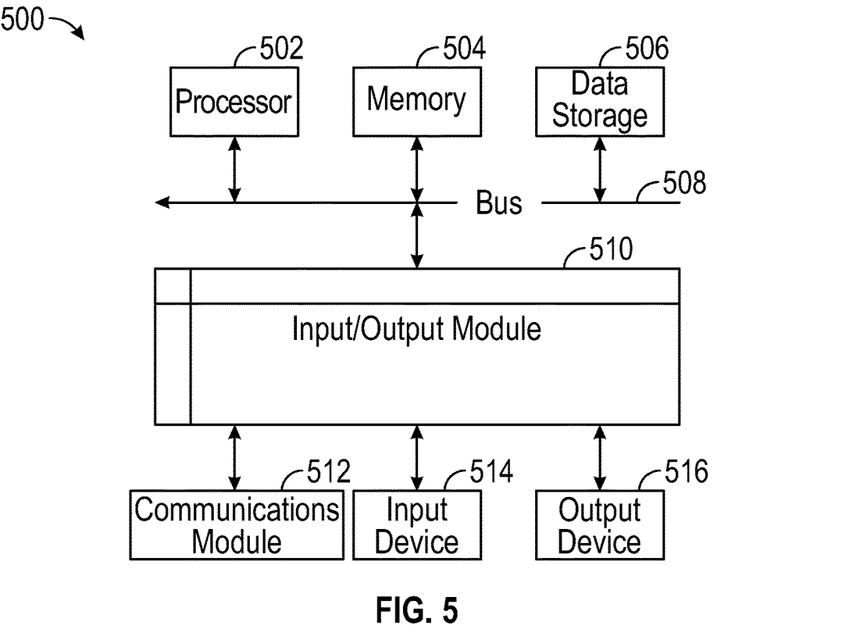
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network or the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for connecting to an independent software vendor (ISV), comprising:
   receiving, at an integrated platform, a request to initiate a data connection with the ISV, the request comprising a selection of a service from a data analytics service in the integrated platform;
   connecting an ISV account of a first client, in response to the request, to the integrated platform;
   generating, through the integrated platform, an asynchronous and secured message comprising a unique identifier;
   associating, through the asynchronous and secured message of the integrated platform, the data connection with the unique identifier;
   matching a state token of an authorization code with the unique identifier of the data connection;
   exchanging, with a connector service, the authorization code for tokens;
   establishing the data connection with the ISV;
   receiving access to the ISV through the integrated platform; and
   providing, to the first client, a notification indicating the data connection with the ISV is complete.

2. The computer-implemented method of claim 1, further comprising:
   providing, to the first client, an authorization request from an application in the data analytics service to access a resource in the ISV account of the first client including feed updates, streams and search results in one or more ISVs with accounts of the first client connected to the integrated platform.

3. The computer-implemented method of claim 1, further comprising:
   initiating the data connection with the connector service.

4. The computer-implemented method of claim 1, further comprising:
   encrypting a connection identifier to generate the unique identifier.

5. The computer-implemented method of claim 1, further comprising:
   issuing the authorization code based on authentication of an authorization request for the data connection, the authorization code comprising the state token embedded in a state parameter; and
   including the unique identifier in the state parameter of the authorization request.

6. The computer-implemented method of claim 1, further comprising:
   initiating, through the integrated platform, an authorization request for the data connection, the authorization request comprising the unique identifier.

7. The computer-implemented method of claim 1, further comprising:
   retrieving data of the ISV into the integrated platform through the connector service.

8. A system for connecting to an independent software vendor (ISV), comprising:
   a processor; and
   a memory comprising instructions stored thereon, which when executed by the processor, causes the processor to:
   receive, at an integrated platform, a request to initiate a data connection with the ISV, the request comprising a selection of a data analytics service;
   connect an ISV account of a first client, in response to the request, to the integrated platform;
   generate, through the integrated platform, an asynchronous and secured message comprising a unique identifier;
   associate, through the asynchronous and secured message of the integrated platform, the data connection with the unique identifier;
   match a state token of an authorization code with the unique identifier of the data connection;
   exchange, with a connector service, the authorization code for tokens;
   establish the data connection with the ISV;
   receive access to the ISV through the integrated platform; and
   provide, to the first client, a notification indicating the data connection with the ISV is complete.

9. The system of claim 8, further comprising stored sequences of instructions, which when executed by the processor, cause the processor to:
   provide, to the first client, an authorization request from an application in the data analytics service to access a resource in the ISV account of the first client including feed updates, streams and search results in one or more ISVs with accounts of the first client connected to the integrated platform.

10. The system of claim 8, further comprising stored sequences of instructions, which when executed by the processor, cause the processor to:
    initiate the data connection with the connector service.

11. The system of claim 8, further comprising stored sequences of instructions, which when executed by the processor, cause the processor to:
    encrypt a connection identifier to generate the unique identifier.

12. The system of claim 8, further comprising stored sequences of instructions, which when executed by the processor, cause the processor to:
    issue the authorization code based on authentication of an authorization request for the data connection, the authorization code comprising the state token embedded in a state parameter; and
    include the unique identifier in the state parameter of the authorization request.

13. The system of claim 8, further comprising stored sequences of instructions, which when executed by the processor, cause the processor to:
    initiate, through the integrated platform, an authorization request for the data connection, the authorization request comprising the unique identifier.

14. The system of claim 8, further comprising stored sequences of instructions, which when executed by the processor, cause the processor to:
    retrieve data of the ISV into the integrated platform through the connector service.

15. A non-transitory computer-readable storage medium is provided including instructions that, when executed by a processor, causes the processor to perform a method for connecting to an independent software vendor (ISV), comprising:
    receiving, at an integrated platform, a request to initiate a data connection with the ISV, the request comprising a selection of a data analytics service;

connecting an ISV account of a first client, in response to the request, to the integrated platform;

generating, through the integrated platform, an asynchronous and secured message comprising a unique identifier;

associating, through the asynchronous and secured message of the integrated platform, the data connection with the unique identifier;

matching a state token of an authorization code with the unique identifier of the data connection;

exchanging, with a connector service, the authorization code for tokens;

establishing the data connection with the ISV;

receiving access to the ISV through the integrated platform; and providing, to the first client, a notification indicating the data connection with the ISV is complete.

16. The non-transitory computer-readable storage medium of claim 15, further comprising instructions for:

providing, to the first client, an authorization request from an application in the data analytics service to access a resource in the ISV account of the first client including feed updates, streams and search results in one or more ISVs with accounts of the first client connected to the integrated platform.

17. The non-transitory computer-readable storage medium of claim 15, further comprising instructions for:

initiating the data connection with a connector service.

18. The non-transitory computer-readable storage medium of claim 15, further comprising instructions for:

encrypting a connection identifier to generate the unique identifier.

19. The non-transitory computer-readable storage medium of claim 15, further comprising instructions for:

issuing the authorization code based on authentication of an authorization request for the data connection, the authorization code comprising the state token embedded in a state parameter; and including the unique identifier in the state parameter of the authorization request.

20. The non-transitory computer-readable storage medium of claim 15, further comprising instructions for:

initiating, through the integrated platform, an authorization request for the data connection, the authorization request comprising the unique identifier.

* * * * *